United States Patent [19]

Friedrich et al.

[11] Patent Number: 5,228,385
[45] Date of Patent: Jul. 20, 1993

[54] CONVECTION OVEN FOR BAKERY GOODS

[75] Inventors: Robert J. Friedrich; Axel Bender, both of Greensboro, N.C.

[73] Assignee: Friedrich Metal Products Co., Inc., Brown Summit, N.C.

[21] Appl. No.: 845,273

[22] Filed: Mar. 3, 1992

[51] Int. Cl.$^5$ ............ A21B 1/06; A21B 5/00; A47J 37/00; F27B 9/00

[52] U.S. Cl. ................. 99/352; 34/197; 126/21 A; 165/919; 219/400; 99/447; 99/448; 99/476

[58] Field of Search .......... 99/352, 401, 447, 448, 99/450, 467, 468, 473-476, 477; 126/21, 21 R, 21 A, 19 R, 41 R, 273 R; 219/400, 401, 388; 34/191, 196, 197, 219, 212, 236-238; 432/176, 144, 199, 153, 200, 176; 312/236; 165/919, 918

[56] References Cited

U.S. PATENT DOCUMENTS

| | | | |
|---|---|---|---|
| 1,345,107 | 6/1920 | Rinck | 107/55 |
| 3,537,405 | 11/1970 | Verhoeven | 219/400 |
| 3,595,178 | 7/1971 | Dahlen | 107/55 |
| 3,861,378 | 1/1975 | Rhoads et al. | 126/21 A |
| 3,905,760 | 9/1975 | Johansson et al. | 432/176 |
| 3,954,053 | 5/1976 | Johansson et al. | 99/443 R |
| 4,039,278 | 8/1977 | Denholm | 34/196 |
| 4,089,322 | 5/1978 | Guibert | 312/236 |
| 4,132,216 | 1/1979 | Guibert | 219/400 |
| 4,162,141 | 7/1979 | West | 432/144 |
| 4,202,259 | 5/1980 | Johansson et al. | 99/352 |
| 4,484,517 | 11/1984 | Amann | 99/474 |
| 4,779,604 | 10/1988 | Konig | 34/197 |
| 4,782,214 | 11/1988 | Voegtlin | 219/401 |
| 4,785,151 | 11/1988 | Voegtlin | 126/21 A |
| 4,892,083 | 1/1990 | Konig | 126/21 |
| 4,984,557 | 1/1991 | Konig | 126/21 A |
| 5,129,384 | 7/1992 | Parks | 99/447 |

FOREIGN PATENT DOCUMENTS

| | | | |
|---|---|---|---|
| 0371845 | 6/1990 | European Pat. Off. | 99/476 |
| 3428330 | 2/1985 | Fed. Rep. of Germany | 126/21 A |

OTHER PUBLICATIONS

Brochure entitled "Gemini Presents Dahlen Rack Ovens", undated.
Brochure entitled "Baker's Aid Rotator Rack Oven", undated.

Primary Examiner—Timothy F. Simone
Attorney, Agent, or Firm—Rhodes, Coats & Bennett

[57] ABSTRACT

A convection oven for bakery goods. The oven is of the type having sidewalls, a floor, a top and an opening in one of its sidewalls for permitting at least one multilayer wheeled cart to be pushed into and removed from the oven. The oven includes a fan located in the top of the oven for circulating heated air in a closed path through the interior of the oven. A plenum is located in the pair of opposed sidewalls adjacent to the sidewall having the opening The plenum extending substantially from the top to the floor of each sidewall and includes a plurality of horizontal air outlet slots extending substantially the depth of the oven. The horizontal air outlet slots are arranged with a 1:1 correspondence with respect to each rack of the multilayer wheeled cart. Heat recovery means are located in the plenum portion of the opposed sidewalls. An inlet is located in the top of the oven adjacent to the fan for receiving the air after it has passed through the interior of the oven and returning the air to the inlet of the fan.

16 Claims, 2 Drawing Sheets

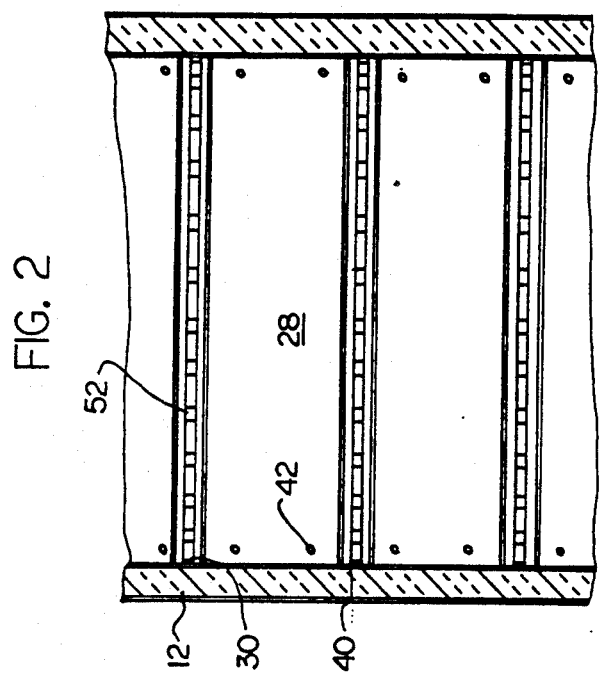
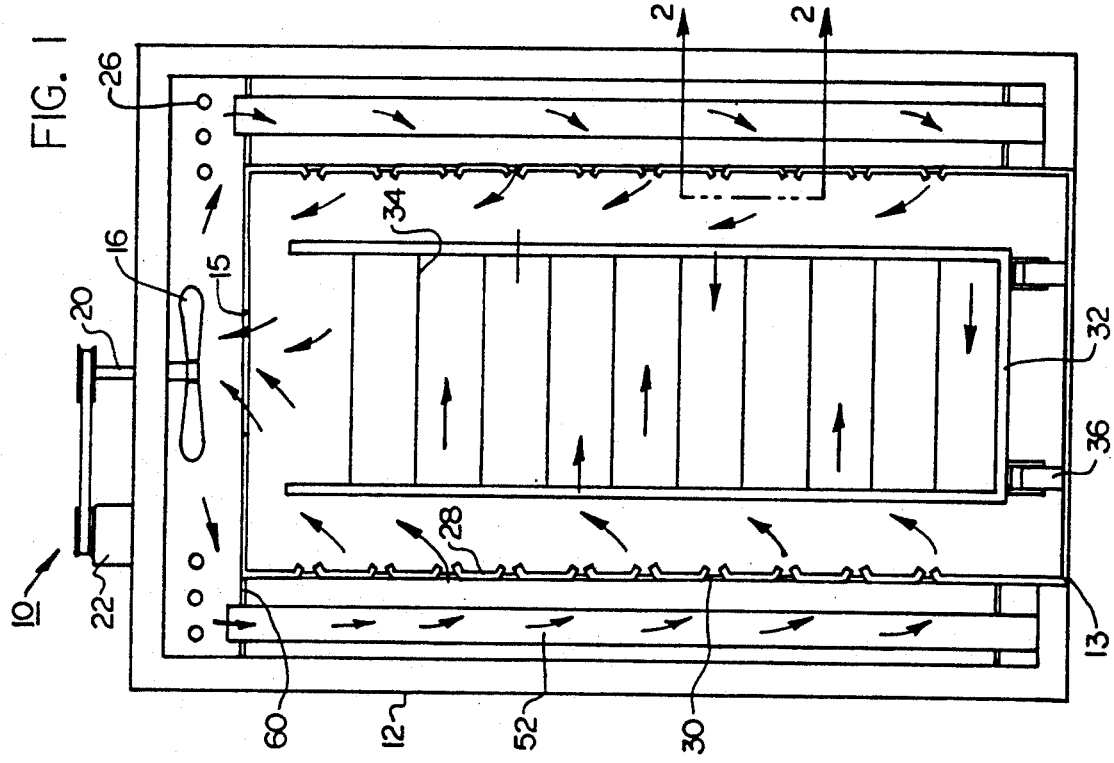

CONVECTION OVEN FOR BAKERY GOODS

BACKGROUND OF THE INVENTION (1) Field of the Invention

The present invention relates generally to convection ovens for baking and, more particularly, to so-called rack ovens.

(2) Description of the Prior Art

Rack ovens are chamber-type ovens in which the bakery products are supported on pans or other carriers in a rack. The rack is usually provided with wheels and can be moved into the oven chamber when loaded with the bakery products and moved from the oven chamber when the baking is completed.

In the past, various devices have been employed to conduct heated air over the bakery products being cooked in the oven. Most of those devices have required various arrangements to move the bakery product or the supporting racks in order to provide even distribution and contact with the heated air passing through the oven. Examples of such ovens are shown in U.S. Pat. No. 3,595,178, issued to Dahlen; U.S. Pat. No. 3,954,053, issued to Johansson; and U.S. Pat. No. 4,202,259, also issued to Johansson.

The reason it has been necessary in the past to provide some kind of device in commercial ovens to cause movement of the bakery products within the oven cooking chamber is to insure that the product will move through the variable heat zones for uniform distribution and for even baking or processing. In contrast, small home use ovens have such a limited volume that it is not necessary to move the product around in the oven to achieve satisfactory baking.

In addition to moving the rack, other arrangements have been utilized to provide for even flow across the baked goods. U.S. Pat. No. 1,345,107, issued to Rinck, discloses a baking oven in which a portion of the flue gases from a firebox located under the baking chamber enters a plurality of ports going from near the top to near the bottom of the oven chamber to cause a downwardly directed current of heated air to thereby mix and circulate the gaseous contents of the oven chamber and prevent it from separating into different layers and pockets of different temperatures. However, such an arrangement would not be adaptable to rack ovens in which the oven chamber is even with the floor of the bakeshop.

U.S. Pat. No. 4,162,141, issued to West, discloses an oven in which a control means delivers various amounts of heated air through an alternating pattern of jet orifices on opposite sides of the oven. Hot air from the jets on the opposite sides of the oven meet in an area of common velocity in the chamber to produce turbulent mixing of the hot air in a vertical plane. The air pressure is varied between the hot air jets and the opposite side walls to cause the vertical plane of turbulent heat air to sweep back and forth through the chamber, thereby contacting the entire product. However, like the other prior art bakery ovens, this arrangement requires additional moving parts in order to continuously vary the air pressure.

Finally, U.S. Pat. Nos. 4,892,083 and 4,984,557, both issued to Konig, disclose a baking oven having a baking chamber in which air channels on both sides are provided with warm air by a blower through a series of small slots which extend over the depth of baking chamber. The heated air introduced into the oven is returned to the blower by means of a air passage opening in the adjacent wall. However, such an arrangement is complex, bulky and expensive to construct.

Thus, there remains a need for a new and improved convection baking oven which provides for even baking of the bakery goods in the rack while, at the same time, is simple to construct and maintain.

SUMMARY OF THE INVENTION

The present invention is directed to a convection bakery oven of the type having sidewalls, a floor, a top and an opening in one of its sidewalls for permitting at least one multilayer wheeled cart to be pushed into and removed from the oven. The oven includes a fan located in the top of the oven for circulating heated air in a closed path through the interior of the oven. A plenum is located in the pair of opposed sidewalls adjacent to the sidewall having the opening.

The plenum extending substantially from the top to the floor of each sidewall and includes a plurality of horizontal air outlet slots extending substantially the depth of the oven. In the preferred embodiment each of the horizontal air outlet slots further includes a pair of generally parallel walls perpendicular to the surface of each sidewall for directing air into the interior of the oven. The horizontal air outlet slots and the pair of generally parallel walls perpendicular to the surface of each sidewall are formed at a radius of approximately $\frac{1}{4}$ inch which improves the stability of the air flow pattern into the oven. In addition, the horizontal air outlet slots are arranged with a 1:1 correspondence with respect to each rack of the multilayer wheeled cart.

Heat recovery means are located in the plenum portion of each of the opposed sidewalls. The heat recovery means includes a plurality of vertically arranged bars and a support means located in the top and bottom portions of the plenum for supporting the bars. The support means located in the top and bottom portions of the plenum for supporting the bars includes an upper panel and a lower panel located at the top and bottom of the plenum. Each panel has a plurality of parallel slots for receiving and retaining the bars.

An inlet is located in the top of the oven adjacent to the fan for receiving the air after it has passed through the interior of the oven and returning the air to the inlet of the fan.

Accordingly, one aspect of the present invention is to provide a convection oven for bakery goods of the type having sidewalls, a floor, a top and an opening in one of its sidewalls for permitting at least one multilayer wheeled cart to be pushed into and removed from the oven. The oven includes: (a) a fan located in the top of the oven for circulating heated air in a closed path through the interior of the oven; (b) a plenum portion located in the pair of opposed sidewalls adjacent to the sidewall having the opening, the plenum extending substantially from the top to the floor of each sidewall and including a plurality of horizontal air outlet slots extending substantially the depth of the oven; and (c) an inlet located in the top of the oven adjacent to the fan for receiving the air after it has passed through the interior of the oven and returning the air to the inlet of the fan.

Another aspect of the present invention is to provide a convection oven for bakery goods of the type having sidewalls, a floor, a top, an opening in one of its sidewalls for permitting at least one multilayer wheeled cart to be pushed into and removed from the oven, means for circulating heated air in a closed path through the interior of the oven, and a plenum portion located in the pair of opposed sidewalls adjacent to the sidewall having the opening, the plenum extending substantially from the top to the floor of each sidewall. The plenum includes a plurality of horizontal air outlet slots, wherein each of the horizontal air outlet slots further includes a pair of generally parallel walls perpendicular to the surface of each sidewall for directing air into the interior of the oven.

Still another aspect of the present invention is to provide a convection oven for bakery goods of the type having sidewalls, a floor, a top and an opening in one of its sidewalls for permitting at least one multilayer wheeled cart to be pushed into and removed from the oven. The oven including: (a) a fan located in the top of the oven for circulating heated air in a closed path through the interior of the oven; (b) a plenum portion located in the pair of opposed sidewalls adjacent to the sidewall having the opening, the plenum extending substantially from the top to the floor of each sidewall and including a plurality of horizontal air outlet slots extending substantially the depth of the oven; (c) heat recovery means located in the plenum portion of the opposed sidewalls; and (d) an inlet located in the top of the oven adjacent to the fan for receiving the air after it has passed through the interior of the oven and returning the air to the inlet of the fan.

These and other aspects of the present invention will become apparent to those skilled in the art after a reading of the following description of the preferred embodiment when considered with the drawings.

BRIEF DESCRIPTION OF THE DRAWINGS

FIG. 1 is a cross-section view of a convection oven, constructed according to the present invention, illustrating the airflow pattern within the oven;

FIG. 2 is an enlarged view of one side wall of the oven shown in FIG. 1 taken along lines 2—2;

DESCRIPTION OF THE PREFERRED EMBODIMENTS

Figure 5:
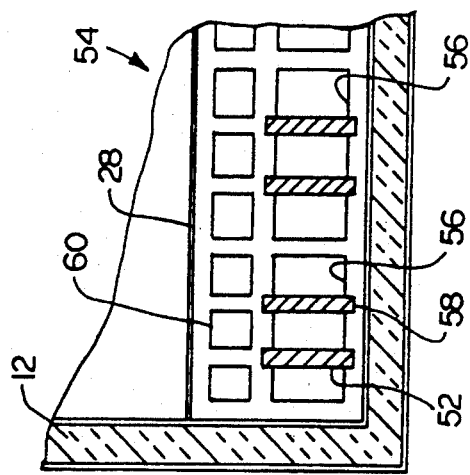
FIG. 5 is an enlarged view of the side wall shown in FIG. 4 taken along lines 5—5 illustrating the plenum inlet support assembly.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a convection oven, generally designated 10, is shown constructed according to the present invention. The convection bakery oven 10 includes an insulated outer wall 12. One side of the insulated outer wall 12 has an opening 13 having a door for permitting the bakery goods to be placed the oven 10. The top 14 of the oven 10 includes inlet 15 and a fan 16 attached to a shaft 20 and driven by a motor 22.

The top 14 of oven 10 and two of the side walls 12 define an inverted U-shaped plenum for supplying air to oven 10. Resistant heaters 26 are located on either side of the outlet portion of the fan 16. The heated air then passes along interior walls 28 and passes out of horizontal slots 30 into the oven interior.

The oven interior is sized to receive a rack cart 32 which includes a plurality of tray supports 34. Cart 32 is mounted on wheels to permit it to be easily moved into and out of the interior of oven 10. In the preferred embodiment, there is a 1:1 correspondence between the trays located on cart 32 and each of the horizontal slots 30. In the most preferred embodiment each slot is located approximately $1\frac{1}{4}''$ below its corresponding tray support 34.

Turning now to FIG. 2, it can be seen that interior walls 28 are attached to a pair of support rails 40 located on either side of the insulated outer walls 12. Interior walls 28 are fastened to the support rails 40 by conventional fasteners 42 and spaced apart to define the horizontal slots 30.

Figure 3:
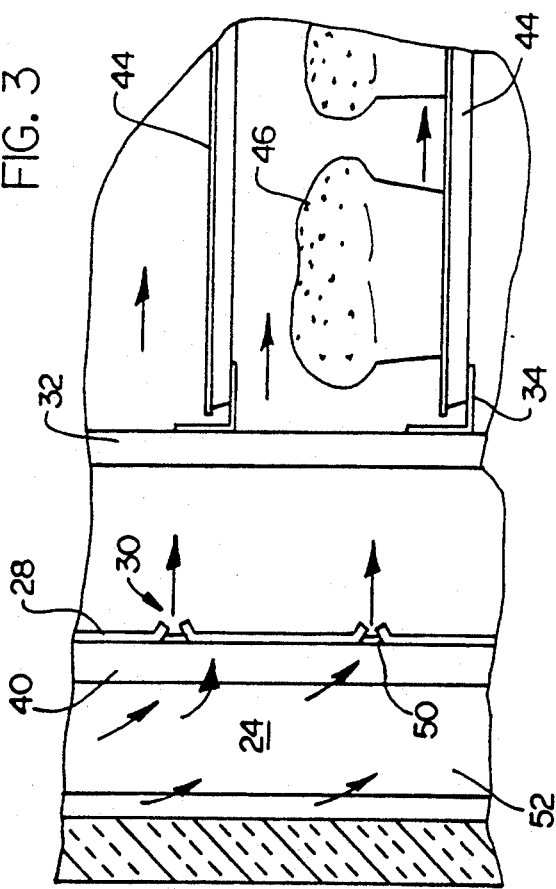
FIG. 3 is an enlarged fragmentary view of the side wall shown in FIG. 1.

As best seen in FIG. 3, the edges of each interior wall 28 adjacent to slot 30 are L-shaped with corresponding pairs of wall panels 48 forming a passageway for the air to enter the interior of the oven 10. In the preferred embodiment, the L-shaped edges 48 are formed along a $\frac{1}{4}''$ radius 50 to provide for smooth airflow into the oven 10.

Prior to arriving at this arrangement, a prototype convection oven having vertical slots was tested. However, there was considerable variability in the temperature and the condition of the final baked goods between the top and bottom of the oven. In addition, an oven having horizontal slots but without the L-shaped edges formed into a radius 50 were also tried. However, like the vertical slot arrangement, this arrangement did not provide the desired uniformity in heating in the oven.

As previously pointed out, there also is a 1:1 correspondence between each slot and tray support 34. This arrangement allows for flow from slot 30 to pass approximately $1\frac{1}{4}''$ beneath each tray 44. Trays 44 are adapted to hold the bakery goods 46 and the heated convection air passes somewhat over the surface of the bakery goods 46 during operation of the oven. The spacing between adjacent trays is 6 inches.

Figure 4:
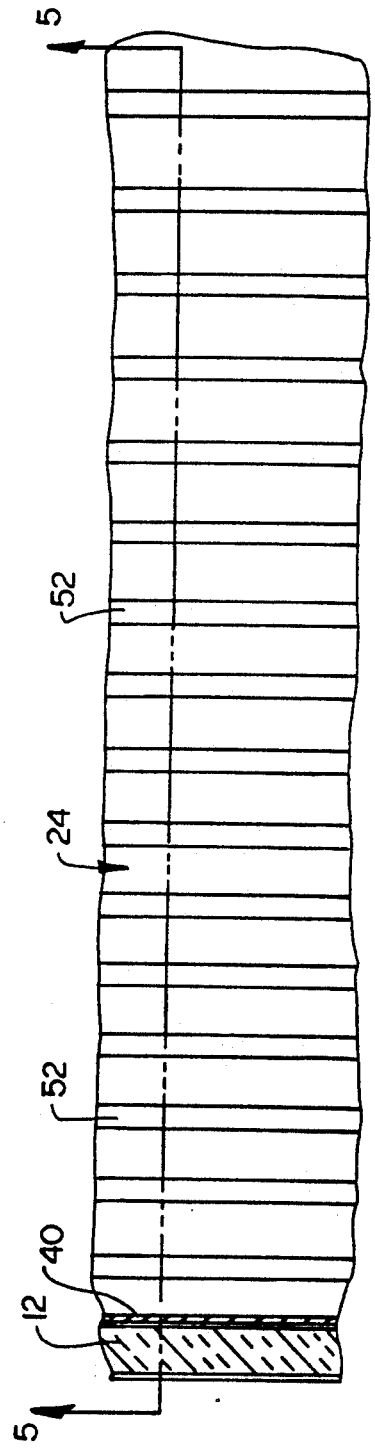
FIG. 4 is an enlarged view of one side wall of the oven shown in FIG. 2 with the interior wall removed to illustrate the aluminum heat-retaining bars located in the plenum.

Turning now to FIG. 4, there is shown an enlarged view of one side wall of the oven with the interior wall plates 28 removed to illustrate the plurality of heat retaining bars 52 located in plenum 24. In the preferred embodiment, bars 52 have a rectangular cross-section of $\frac{1}{2} \times 3''$ and are about 6 feet in length. In the preferred embodiment, for an oven 35 inches deep, there are 16 bars on each side of the oven. In the most preferred embodiment, for an oven of about 70" in height, approximately 150 lbs. of aluminum is used on each side of the oven. This corresponds to about 9 lbs. of aluminum per square foot of surface area of the interior side walls. For rectangular cross-section bars, this corresponds to about $\frac{1}{4}$ square foot of surface area of the bars per square foot of the surface of the interior side walls.

In the past for this size oven, it has been the practice to use approximately 1,000 lbs. of steel rods for heat recovery of the oven after the door has been opened. However, it has been found that by substituting the aluminum bars having rectangular cross-section not only is only 300 lbs. of aluminum required but that power requirements for the oven are reduced from between 120–150 amps to only about 100 amps while still providing satisfactory operation of the oven.

Finally turning to FIG. 5, there is shown an enlarged view of the top of the side wall 12 illustrating the plenum inlet support assembly 54. Assembly 54 includes primary openings 56 which include mounting notches 58 for holding the aluminum bars 52 in place. Secondary opening 60 are arranged between primary openings 56 and interior walls 28. Secondary openings 60 provide for about approximately 33% of the total flow through the inlet support assembly 54 and help to equalize the pressure in plenum 24 which causes the air flowing about the bars 52 to be better mixed. Total flow for each plenum side wall is approximately 1200 cubic feet per minute. The air exits the horizontal slots 30 at about approximately 1900 feet per minute. This quantity of air moving at that velocity serves to provide sufficient turbulence in the interior chamber of oven 10 so as to eliminate the prior art necessity of rotating cart 32 in order to provide sufficient uniformity of heating of the bakery goods. The resulting design is simple to construct and maintain and is not as bulky as prior art solutions to the problem.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A convection oven for bakery goods of the type having a front wall, a back wall, a pair of opposed sidewalls, a floor, a top and an opening in said front wall for permitting at least one multilayer wheeled cart to be pushed into and removed from the oven, said oven comprising:
   (a) a fan located in the top of the oven for circulating heated air in a closed path through the interior of the oven;
   (b) a plenum portion located in the pair of opposed sidewalls adjacent the sidewall having the opening, said plenum extending substantially from the top to the floor of each sidewall and including a plurality of horizontal air outlet slots extending substantially the depth of said oven;
   (c) heat recovery means located in the plenum portion of said opposed sidewalls, wherein said heat recovery means includes a plurality of vertically arranged bars and support means located in the top and bottom portions of said plenum for supporting said bars; and
   (d) an inlet located in the top of the oven adjacent to said fan for receiving the air after it has passed through the interior of the oven and returning the air to the inlet of said fan.

2. The oven according to claim 1, wherein said bars are formed from an aluminum alloy.

3. The oven according to claim 2, wherein said bars include approximately nine pounds of aluminum for each square foot of opposed sidewall.

4. The oven according to claim 1, wherein said bars are formed into a rectangular cross-section of about ½ by 3 inches from an aluminum alloy.

5. The oven according to claim 4, wherein said bars include approximately 0.5 square feet of surface area for each square foot of opposed sidewall.

6. The oven according to claim 4, wherein said bars are about 72 inches in length.

7. The oven according to claim 1, wherein said support means located in the top and bottom portions of said plenum for supporting said bars includes an upper panel and a lower panel located at the top and bottom of said plenum, each panel having a plurality of parallel slots for receiving and retaining said bars.

8. The oven according to claim 7, wherein said plurality of parallel slots are arranged substantially perpendicular to the surface of said sidewalls.

9. The oven according to claim 7, wherein said plurality of parallel slots are arranged substantially perpendicular to said horizontal air outlet slots extending substantially the depth of said oven.

10. The oven according to claim 7, wherein said upper support panel located at the top of said plenum includes a plurality of air inlet ports for providing additional air flow into said plenum.

11. The oven according to claim 1, wherein each of said horizontal air outlet slots further includes a pair of generally parallel walls perpendicular to the surface of each sidewall for directing air into the interior of the oven.

12. The oven according to claim 11, wherein said horizontal air outlet slots are approximately ¼ inches across and extend substantially the depth of the oven.

13. The oven according to claim 11, wherein said horizontal air outlet slots are approximately four percent of the surface area of each sidewall.

14. The oven according to claim 11, wherein said horizontal air outlet slots and said pair of generally parallel walls perpendicular to the surface of each sidewall for directing air into the interior of the oven are formed at a radius of approximately ¼ inch, thereby improving the stability of the air flow pattern into the oven.

15. The oven according to claim 11, wherein said horizontal air outlet slots are arranged with a 1:1 correspondence with respect to each rack of said multilayer wheeled cart.

16. The oven according to claim 15, wherein said horizontal air outlet slots are arranged approximately 1¼ inches below each rack of said multilayer wheeled cart.

* * * * *